United States Patent
Gielisch

(10) Patent No.: US 10,336,132 B2
(45) Date of Patent: Jul. 2, 2019

(54) WHEEL OF A MOTOR VEHICLE WITH A SPOKE AREA COVER

(71) Applicant: Bayerische Motoren Werke Aktiengesellschaft, Munich (DE)

(72) Inventor: Sebastian Gielisch, Unterschleissheim (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 471 days.

(21) Appl. No.: 14/965,102

(22) Filed: Dec. 10, 2015

(65) Prior Publication Data
US 2016/0096398 A1  Apr. 7, 2016

Related U.S. Application Data

(63) Continuation of application No. PCT/EP2014/059991, filed on May 15, 2014.

(30) Foreign Application Priority Data

Jun. 14, 2013  (DE) .................. 10 2013 211 216

(51) Int. Cl.
 *B60B 7/00* (2006.01)
 *B60C 29/06* (2006.01)
 (Continued)

(52) U.S. Cl.
 CPC ............ *B60B 7/0073* (2013.01); *B60B 19/08* (2013.01); *B60C 29/06* (2013.01); *B60C 29/068* (2013.01);
 (Continued)

(58) Field of Classification Search
 CPC ......... B60B 7/00; B60B 7/0073; B60B 7/008; B60B 19/08; B60C 29/068; B60C 29/06
 See application file for complete search history.

(56) References Cited

U.S. PATENT DOCUMENTS 1,503,397 A * 7/1924 Wacker ............... B60B 7/00
                                                  152/524
2,012,449 A   8/1935 Hamilton
(Continued)

FOREIGN PATENT DOCUMENTS

CN     2649366 Y    10/2004
DE   82 17 015 U1    9/1982
(Continued)

OTHER PUBLICATIONS

Japanese-language Office Action issued in counterpart Japanese Application No. 2016-518888 dated Oct. 18, 2017 with German translation (14 pages).

(Continued)

*Primary Examiner* — Kip T Kotter
*Assistant Examiner* — Scott A Browne
(74) *Attorney, Agent, or Firm* — Crowell & Moring LLP

(57) ABSTRACT

A wheel of a motor vehicle includes a hub portion, spokes extending radially outwards from the hub portion, a rim which is supported on the spokes, and a spoke area cover which is delimited by the rim. A respective cover is provided on both sides of the spokes, i.e. facing the interior side of the spokes and facing the exterior side of the spokes. The interior-side cover, which is annular when seen in a projection in the direction of the wheel rotational axis, is adhered to the edge of the hub portion and to an annular region of the rim and/or the interior side of the spokes. The exterior-side cover is designed in an annular manner either over its entire surface or when seen in a projection in the direction of the wheel rotational axis and can be interchangeably inserted into a groove in an annular rim region and/or in an annular region of the rim and the hub portion with an intermediately positioned seal element.

12 Claims, 5 Drawing Sheets

(51) Int. Cl.
*B60B 19/08* (2006.01)
*B60B 7/06* (2006.01)
*B60B 1/06* (2006.01)
*B60C 29/02* (2006.01)

(52) U.S. Cl.
CPC . *B60B 1/06* (2013.01); *B60B 7/00* (2013.01); *B60B 7/061* (2013.01); *B60B 2360/30* (2013.01); *B60B 2900/1216* (2013.01); *B60B 2900/211* (2013.01); *B60B 2900/572* (2013.01); *B60C 29/02* (2013.01); *B60C 29/064* (2013.01); *Y02T 10/88* (2013.01)

(56) References Cited

U.S. PATENT DOCUMENTS

| | | | | |
|---|---|---|---|---|
| 2,066,729 | A * | 1/1937 | Hobb | B60B 25/20 152/405 |
| 2,742,075 | A * | 4/1956 | Courchesne | B60C 17/02 152/418 |
| 2,900,007 | A * | 8/1959 | Hoogendoorn | B60C 29/02 152/415 |
| 3,099,401 | A * | 7/1963 | Bell | B60Q 1/326 362/500 |
| 3,361,483 | A * | 1/1968 | Main | B60B 7/00 301/37.42 |
| 4,503,944 | A * | 3/1985 | Burckhardt | B60B 7/00 188/218 A |
| 4,842,339 | A * | 6/1989 | Roulinson | B60B 7/02 301/108.4 |
| 5,461,208 | A * | 10/1995 | McKenna | H01H 35/34 200/302.1 |
| 5,641,208 | A * | 6/1997 | Stach | B60B 1/06 301/104 |
| 6,412,525 | B1 * | 7/2002 | Nienhaus | B60C 23/003 141/38 |
| 8,453,692 | B2 * | 6/2013 | Saadat | B60B 1/08 152/415 |
| 2008/0001468 | A1 * | 1/2008 | Hauler | B60B 7/0053 301/37.105 |
| 2013/0269849 | A1 * | 10/2013 | Hennig | B60C 23/003 152/427 |

FOREIGN PATENT DOCUMENTS

| | | | |
|---|---|---|---|
| DE | 8217015 U1 * | 9/1982 | ............... B60C 7/00 |
| DE | 31 12 652 A1 | 10/1982 | |
| DE | 39 21 736 A1 | 1/1991 | |
| DE | 91 11 113 U1 | 11/1991 | |
| DE | 101 45 085 A1 | 6/2002 | |
| DE | 10 2009 024 792 A1 | 12/2010 | |
| EP | 1 647 417 A1 | 4/2006 | |
| FR | 2 838 674 A1 | 10/2003 | |
| JP | 50-65474 U | 6/1975 | |
| JP | 62-12506 U | 1/1987 | |
| JP | 4-43504 U | 4/1992 | |
| JP | 5-65601 U | 8/1993 | |
| JP | 6-85101 U | 12/1994 | |
| JP | 2003-118302 A | 4/2003 | |
| JP | 2003-237302 A | 8/2003 | |

OTHER PUBLICATIONS

Chinese-language Office Action issued in counterpart Chinese Application No. 201480030053.6 dated Aug. 30, 2016 with English translation (Fifteen (15) pages).
International Search Report (PCT/ISA/210) issued in PCT Application No. PCT/EP2014/059991 dated Aug. 7, 2014 with English translation (six pages).
German Search Report issued in counterpart German Application No. 10 2013 211 216.5 dated Jan. 27, 2014 with partial English translation (10 pages).
English translation of document C4 (Japanese-language Office Action issued in counterpart Japanese Application No. 2016-518888 dated Oct. 18, 2017) previously filed on Dec. 22, 2017 (four pages).

* cited by examiner

WHEEL OF A MOTOR VEHICLE WITH A SPOKE AREA COVER

CROSS REFERENCE TO RELATED APPLICATIONS

This application is a continuation of PCT International Application No. PCT/EP2014/059991, filed May 15, 2014, which claims priority under 35 U.S.C. § 119 from German Patent Application No. 10 2013 211 216.5, filed Jun. 14, 2013, the entire disclosures of which are herein expressly incorporated by reference.

BACKGROUND AND SUMMARY OF THE INVENTION

The invention relates to a wheel of a motor vehicle having a hub portion, spokes extending radially outwards from the hub portion and a rim which is supported on the spokes, as well as a spoke area cover which is delimited by the rim. With regard to prior art, reference is made, for example, to DE 10 2009 024 792 A1.

Cover plates or cover elements for automotive wheels, which are colloquially referred to as rims, are known in various embodiments. Such a cover plate, as is proposed in the aforementioned document as a "rim" (which actually only covers the annular area containing the spokes between the hub portion and the actual rim on which a wheel tire is mounted), is presently designated as a spoke area cover. The spoke area of the annular area is between the hub portion and the rim. In the prior art according to the cited document, the cover is provided on the interior side of the spokes (in a mounted state on the vehicle), in order to at least reduce the impingement on the spokes of wear debris from the friction brake of the vehicle located in the so-called rim bowl. This cover (or this covering element) is made of plastic, in particular polycarbonate.

In principle, a known cover fulfills the above-mentioned requirement, however further requirements are placed on vehicle wheels and thereby also on those with spokes, which may advantageously be designed in a lightweight construction in particular through the use of suitable materials, said requirements here regarding the greatest possible minimization of the air resistance coefficient of the motor vehicle.

The object of the present invention is to provide a measure to minimize the air resistance coefficient of the motor vehicle.

This and other objects are achieved by a wheel of a motor vehicle, comprising a hub portion, spokes extending radially outwards from the hub portion, a rim which is supported on the spokes, and a spoke area cover which is delimited by the rim, wherein a respective cover is provided on both sides of the spokes, i.e. facing the interior side of the spokes and facing the exterior side of the spokes.

In that a spoke area cover between the hub portion and the rim which extends at least between the rim and the hub portion is provided not only on the side of the wheel facing the interior side of the spokes (in an installed state of the wheel on the vehicle), but also on the side of the wheel facing the exterior side of the spokes (in an installed state of the wheel on the vehicle), air vortexes which would form on the spokes during driving of the vehicle without such a cover are avoided. This results in a reduced air resistance of the vehicle. Here, the cover which covers the annular area in which the spokes are located (="spoke area") on both sides comprises a "continuous" or smooth surface, i.e. any cross sections which are made through this cover should not comprise any abrupt changes in course, so that while driving the vehicle, an airflow which is as low-loss as possible can be formed on the surface thereof.

If the interior-side cover, which is annular when seen in a projection in the direction of the wheel rotational axis, is adhered to the edge of the hub portion and to an annular region of the rim and/or the interior side of the spokes, a secure seal against the entry of brake wear debris or other dust or dirt particles into the spoke area is thus ensured in this location. Advantageously, this connection technique of adhesion is also simple to represent, wherein the cover may be designed in plastic analogous to the known prior art, but may also comprise other suitable materials.

The exterior-side cover may be designed as a complete surface, i.e. extending completely within the rim or, like the interior-side cover, the exterior-side cover may be designed in an annular manner when seen in a projection in the direction of the wheel rotational axis and thus extend between the rim and the hub portion of the wheel. The exterior-side cover is preferably interchangeably mounted on the wheel (in case of optical damage), and its edge can be inserted for this purpose into a groove in an annular rim region (in the former case of a complete surface cover) or (in the latter case of an annular cover) its two edges can be inserted in grooves or the like in an annular region of the rim and in the hub portion.

The spoke area is thus substantially sealed off from the environment by use of the interior-side and exterior-side covers, so that an undesired entry of dirt into the spoke area is substantially excluded. However, due in particular to the interchangeability of the exterior-side cover, a 100% exclusion or seal cannot be guaranteed. In order to avoid the formation of overpressure or underpressure in the spoke area (caused by temperature influences such as sunlight or brake heat and/or airflow conditions at higher driving speeds of a vehicle equipped with a wheel according to the invention), at least one overpressure-dependent and/or underpressure-dependent ventilation opening for the spoke area closed from the environment by way of the covers may be provided either in the hub portion of the wheel or in one of the covers, preferably in the interior-side cover. In order to prevent as far as possible the simultaneous entry of dirt particles in the event of an entry of air into the spoke area caused by underpressure, a suitable air filter element may be provided on the aforementioned ventilation opening. In this case, a single ventilation opening may be provided both for supply and removal of air from the spoke area, alternatively however there may be provided here different ventilation openings.

In order to allow a filling with air (or another gas) of the pneumatic tire fitted to the rim of a wheel according to the invention, a preferably sealingly closeable access opening to an air valve provided in the rim for filling the pneumatic tire may be provided in the exterior-side cover. Alternatively, a central valve may be provided in the hub portion of the wheel, to which is connected a line for the filling of the pneumatic tire which extends inside the wheel, for example in a spoke.

To enable, for example, a visual inspection of the spoke area, for instance for checking the safe function of an aforementioned air filter element on a ventilation opening, the exterior-side cover may be formed in a transparent plastic. This advantageously also results due to the visibility of the spokes in a pleasant visual appearance of a wheel according to the invention.

An advantageous arrangement of a wheel according to the invention on a wheel carrier of a two-track motor vehicle arises along with a wheel brake arranged as usual in the wheel bowl if a cover plate is mounted on the wheel carrier in a somewhat fixed fashion to the vehicle as the air resistance caused by the wheel may hereby be further reduced, particularly at higher driving speeds of the vehicle. The edge of the cover plate lies preferably in the area of the inner rim flange. The wheel bowl is the known, nearly circular cylindrical "cavity" located on the inner side behind the spokes of conventional motor vehicle wheels—delimited by the rim. In order, if necessary, to allow a sufficient cooling of the wheel brake, which is embodied as usual as a friction brake, a supply opening for cooling air and a discharge opening for the supplied cooling air directed toward the friction brake may be provided in the cover plate.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
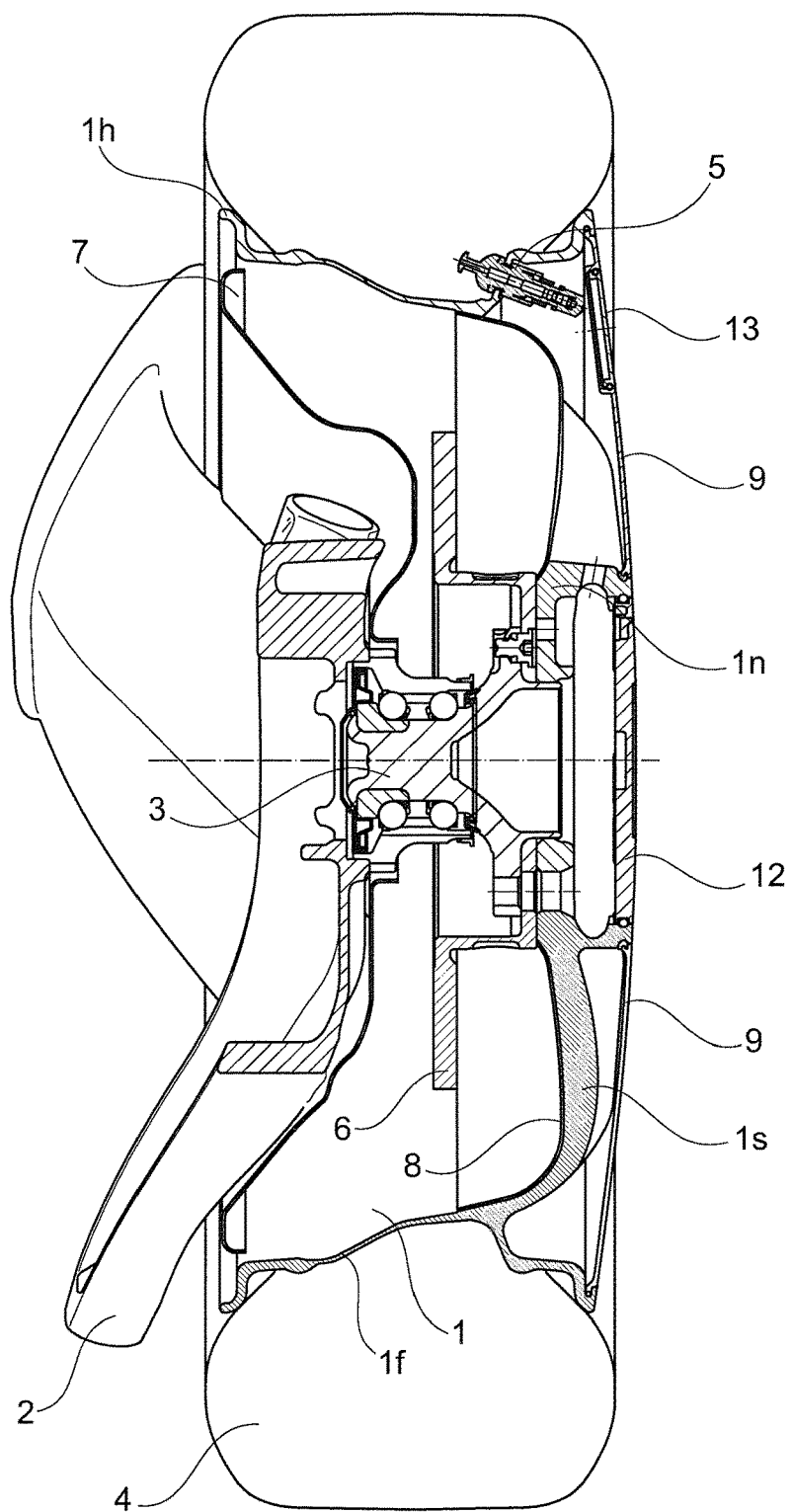
FIG. 1 is a longitudinal section view through a vehicle wheel which is mounted on a wheel carrier of a passenger vehicle according to an embodiment of the invention.

Referring to FIG. 1, a wheel is designated in its entirety with reference character 1, which comprises, as usual, a rim 1f, a plurality of spokes 1s and a hub portion 1n. This wheel 1 is flanged 3 with its hub portion 1n on a hub 3. The hub 3 is rotatably mounted on a wheel carrier 2 of the vehicle which is, as usual, fixed on the vehicle by way of a plurality of control arms and is thus semi-fixed to the vehicle. Further details of FIG. 1 need not (initially) be further discussed; to be briefly mentioned are only a tire 4 mounted on the rim 1f of the wheel 1, a valve 5 provided in the rim 1f for filling the tire 4 with air (or another gas), a brake disc 6 located between the wheel 1 and the hub 3, as well as a covering plate 7 which has been first mentioned before the description of figures and which is semi-fixed to the vehicle. The covering plate 7 is located within the rim bowl of the wheel 1 and is formed in such a way that the edge thereof lies nearly in the plane of the inner rim flange 1h.

Figure 2:
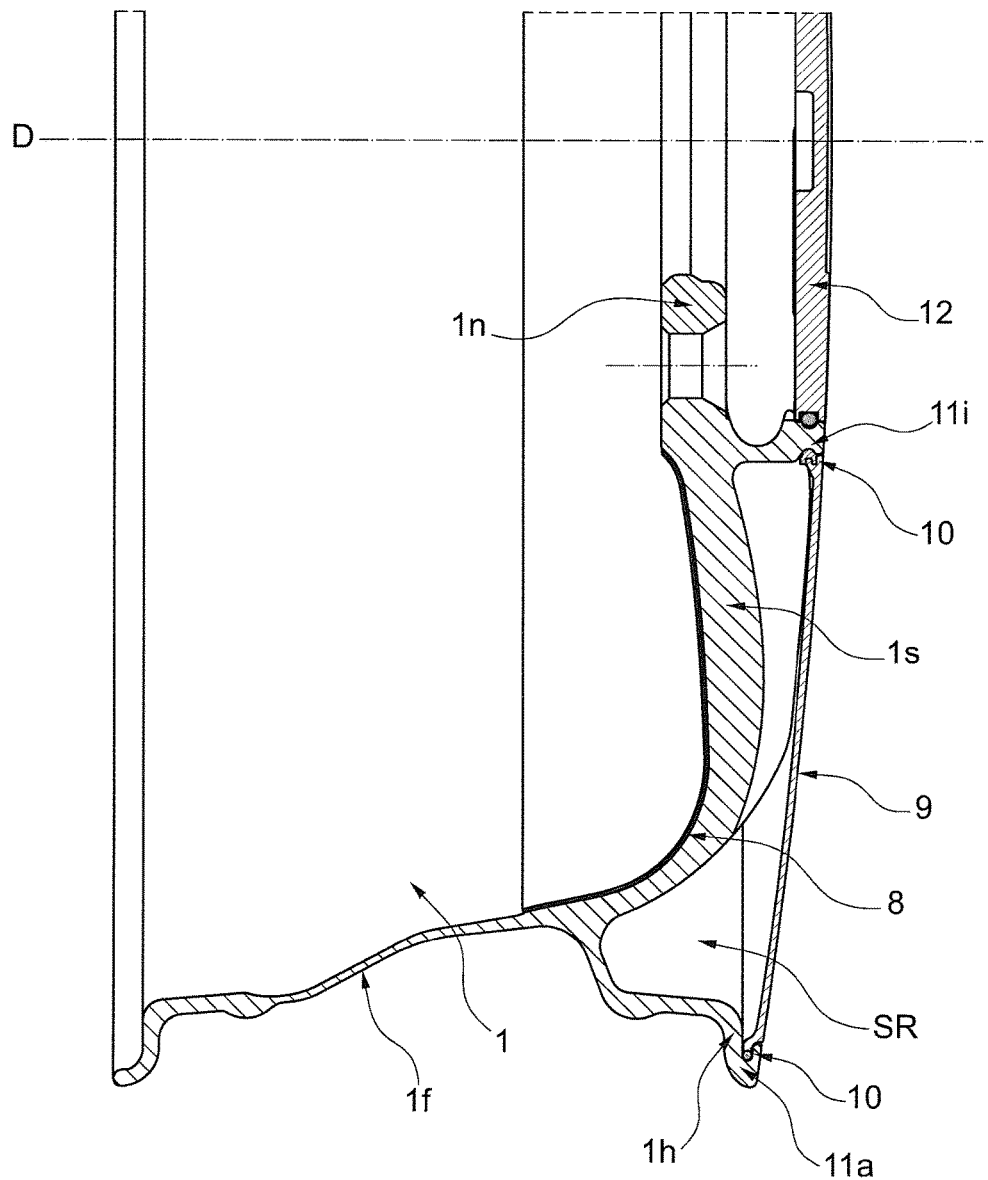
FIG. 2 shows the lower half of the wheel of FIG. 1 in an enlarged view.

FIG. 2 shows an enlarged half of the wheel 1 of FIG. 1. Here, an interior-side cover 8 of the so-called spoke area SR is shown, which is preferably also adhered to the interior side of the spokes 1s and, in particular, to the hub portion 1n and to a portion of the wall of the rim 1f facing the axis of rotation D of the wheel 1. The interior-side cover 8 comprises, for example, a high-strength plastic such as a CFRP material, or a thin aluminum alloy or other suitable material of low specific gravity. Further provided is an exterior-side cover 9 of the spoke area SR, the outer edge of which with respect to the axis of rotation D is inserted with the interposition of a seal 10 into a groove 11a formed in the side of the rim flange 1h facing the axis of rotation D. This exterior-side cover 9 is annular when viewed in the direction of the axis of rotation D. The exterior-side cover 9 has an inner edge likewise inserted with the interposition of a seal 10 into a groove 11i in a ring surface of the hub portion 1n of the wheel facing away from the axis of rotation D. As can be seen, this cover 9 is designed to be slightly curved, so that a surface which is streamlined during movement of a vehicle equipped with this wheel 1 is present on the exterior side of the wheel 1 together with a central covering element 12 of the hub portion 1n, which is fixed comparably to the cover 9 on the hub portion 1n. Here, the contiguous area which is delimited by the interior-side cover 8 and the exterior-side cover 9, as well as the hub portion 1n and an outer portion of the rim, in which contiguous area the spokes 1s of the wheel 1 are located, is presently designated as the spoke area SR. As stated before the description of the figures, the fixing of the exterior-side cover 9 in the grooves 11a and 11i is provided in order to enable the interchangeability of this exterior-side cover 9, wherein the seal 10 is to prevent the entry of dirt or dust particles into the spoke area SR.

Figure 3:
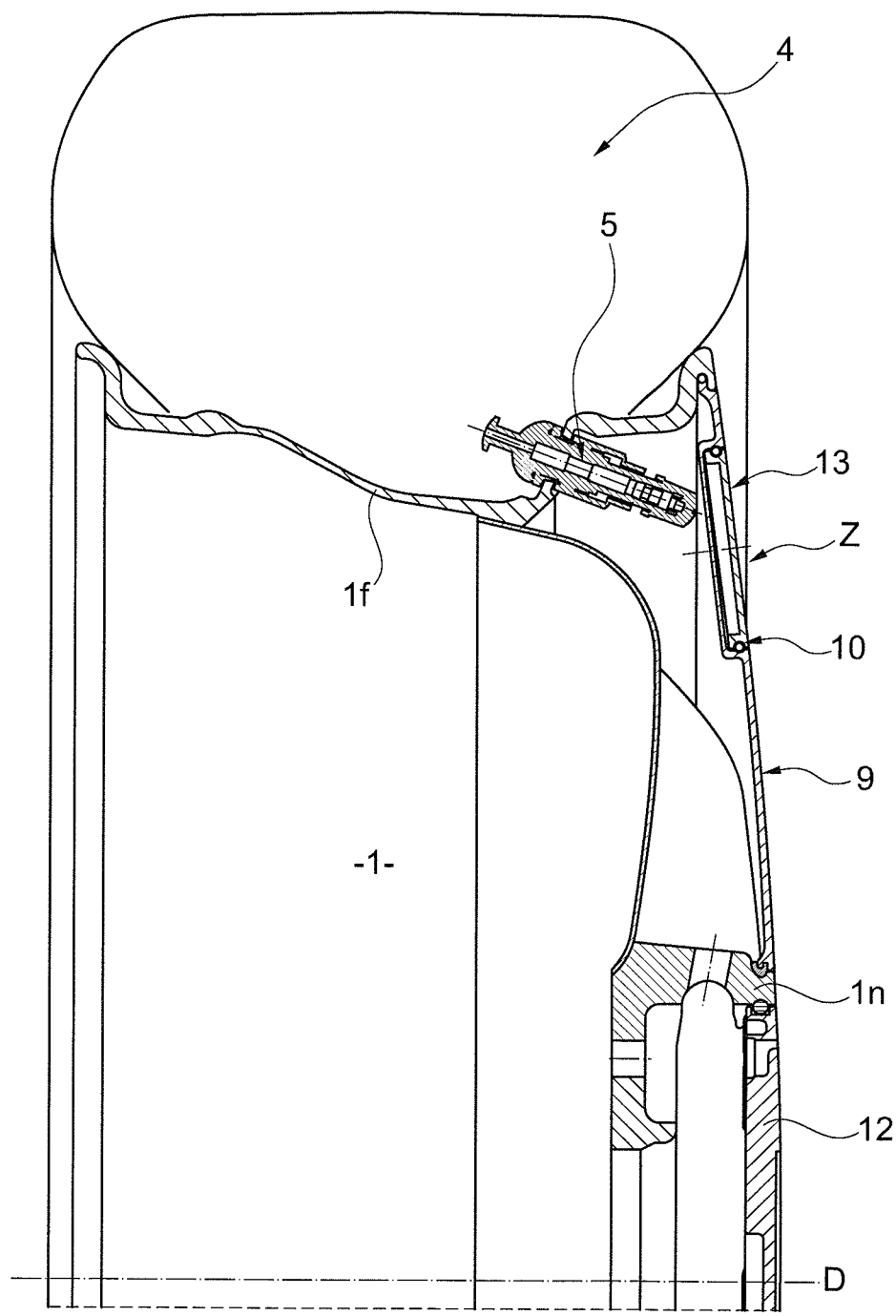
FIG. 3 shows the upper half of the wheel of FIG. 1 in an enlarged view.

In FIG. 3, it can be seen that not only one valve 5 is provided as usual in the rim 1f, but rather also an access opening Z to this valve 5 is provided in the exterior-side cover 9 in the area of the valve 5. The access opening Z is closed with a lid 13. The lid 13 can be removed from the cover 9 for filling the tire 4 via this valve 5 in order to expose the access opening Z. Here, a seal 10 is (once again) provided between the lid 13 and the exterior-side cover 9, which are both formed from a clear or at least transparent plastic material.

Figure 4:
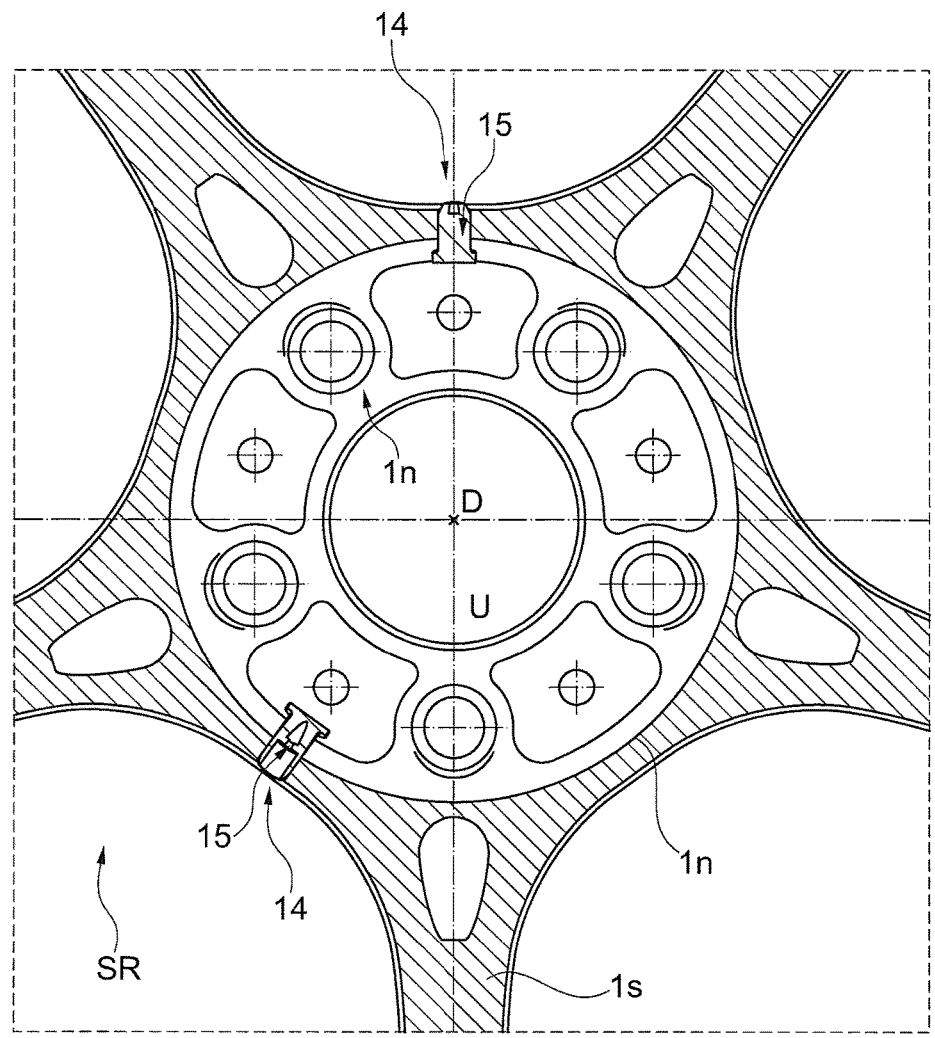
FIG. 4 is a section view through the hub portion of the wheel in a plane perpendicular to the direction of the wheel rotational axis.

FIG. 4 shows a partial section through the hub portion 1n of the wheel 1 in a plane perpendicular to the axis of rotation D. Here, two ventilation openings 14 are shown provided in the hub portion 1n for the spoke area SR, in each of which is used a pressure-dependent, automatically opening and closing membrane valve 15, by which a connection between the spoke area SR and the environment U, here in the usual central cavity of the hub portion 1n, can be established. One of the two membrane valves 15 opens in the presence of underpressure (and may have an air filter element, as schematically indicated by the bold line at the arrow end of lead line 15 in the lower of the illustrated valves), in the spoke area SR, and the other in the presence of overpressure in the spoke area SR, so that ambient pressure always substantially prevails in the spoke area SR.

Figure 5:
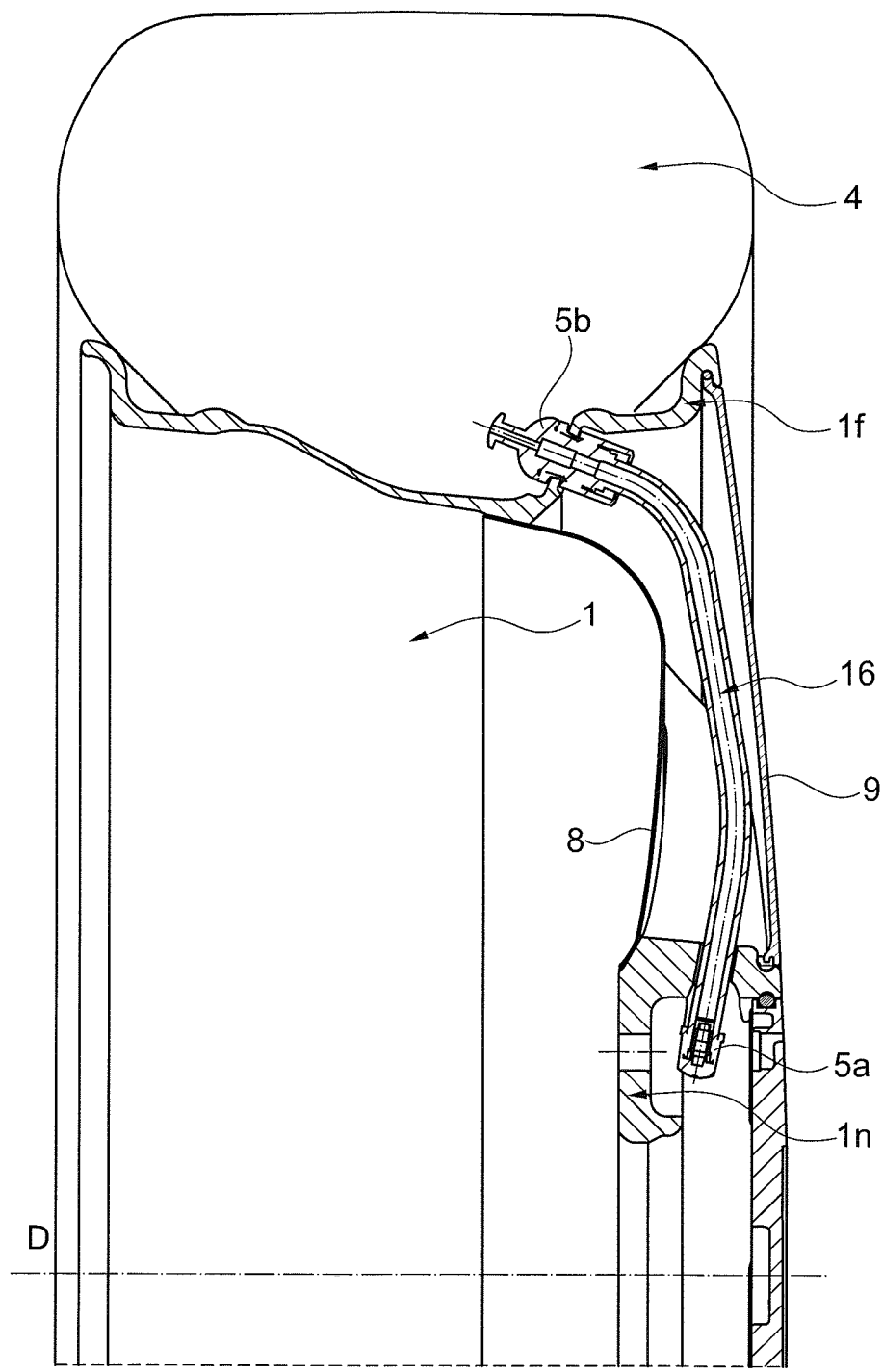
FIG. 5 shows another embodiment in a representation analogous to FIG. 3.

FIG. 5 shows another embodiment of a wheel 1 according to the invention in a partial section analogous to the previously discussed FIG. 3. In this embodiment, a central valve 5a is arranged behind the removable central covering element 12 (see explanation of FIG. 2), which is connected via an air line 16 with a rim valve 5b mounted in the rim 1f (similar to FIG. 3) for filling the pneumatic tire 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A wheel of a motor vehicle, comprising:
a hub portion;
spokes extending radially outward from the hub portion;
a rim supported on the spokes;
an interior-side spoke area cover facing an interior side of the spokes;

an exterior-side spoke area cover delimited by the rim facing an exterior side of the spokes; and at least one over pressure-controlled and/or under pressure-controlled ventilation opening, the at least one ventilation opening being arranged to automatically ventilate a spoke area between the interior and exterior-side covers that is closed from the environment.

2. The wheel according to claim 1, wherein
the interior-side cover has an annular form when seen in a projection in a direction of the wheel rotational axis, and
the interior-side cover is adhered to an edge of the hub portion and to an annular region of the rim and/or an interior side of the spokes.

3. The wheel according to claim 2, wherein
the exterior-side cover has an annular form over an entire surface or when viewed in a projection in the direction of the wheel rotational axis,
the exterior-side cover is interchangeably inserted into a groove in an annular rim region, or is interchangeably inserted into grooves in the annular rim region and in a hub portion, with an intermediately positioned seal element at each groove.

4. The wheel according to claim 1, wherein
the exterior-side cover has an annular form over an entire surface or when viewed in a projection in the direction of the wheel rotational axis,
the exterior-side cover is interchangeably inserted into a groove in an annular rim region, or is interchangeably inserted into grooves in the annular rim region and in a hub portion, with an intermediately positioned seal element at each groove.

5. The wheel according to claim 1, wherein the exterior-side cover has a sealingly closable access opening, the sealingly closable access opening being arranged for an air valve provided in the rim to fill a pneumatic tire mounted on the rim.

6. The wheel according to claim 3, wherein the exterior-side cover has a sealingly closable access opening, the sealingly closable access opening being arranged for an air valve provided in the rim to fill a pneumatic tire mounted on the rim.

7. The wheel according to claim 1, further comprising:
a central valve provided in the hub portion; and
a fill line connected to the central valve for filling a pneumatic tire mounted on the rim.

8. The wheel according to claim 3, further comprising:
a central valve provided in the hub portion; and
a fill line connected to the central valve for filling a pneumatic tire mounted on the rim.

9. The wheel according to claim 1, wherein two overpressure-controlled and/or underpressure-controlled ventilation openings are provided, one being an overpressure-controlled ventilation opening and another being an underpressure-controlled ventilation opening.

10. The wheel according to claim 1, further comprising:
an air filter provided for the ventilation opening to filter contaminants from entering the spoke area due to underpressure.

11. The wheel according to claim 1, wherein the exterior-side cover comprises a clear plastic.

12. A wheel end arrangement for a two-track motor vehicle, comprising:
a wheel carrier;
a wheel comprising a hub portion, spokes extending radially outwards from the hub portion, a rim supported on the spokes, an interior-side spoke area cover and an exterior-side spoke area cover, the interior and exterior-side spoke area covers being delimited by the rim,
at least one over pressure-controlled and/or under pressure-controlled ventilation opening, the at least one ventilation opening being arranged to automatically ventilate a spoke area of the wheel between the interior and exterior-side covers that is closed from the environment;
a cover plate mounted on the wheel carrier;
a wheel brake arranged in a wheel bowl, the wheel bowl being delimited by the rim,
wherein
the wheel is mounted on the wheel carrier, and
an edge of the cover plate lies in an area of an inner rim flange and is configured to provide a supply opening for cooling air and a discharge opening for supplied cooling air directed toward the wheel brake.

* * * * *